US012753079B2

(12) United States Patent
Kim et al.

(10) Patent No.: US 12,753,079 B2
(45) Date of Patent: Oct. 6, 2026

(54) METHOD FOR PREPARING POROUS CARBON STRUCTURE HAVING INCREASED SURFACE AREA AND TOTAL PORE VOLUME, AND POROUS CARBON STRUCTURE PREPARED USING SAME

(71) Applicant: KOLON INDUSTRIES, INC., Seoul (KR)

(72) Inventors: Jung Ho Kim, Seoul (KR); Jun Young Kim, Seoul (KR); Kah-Young Song, Seoul (KR); Nakwon Kong, Seoul (KR); Jusung Lee, Seoul (KR); Kyoungsik Nam, Seoul (KR); Chanmi Park, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 429 days.

(21) Appl. No.: 18/255,378

(22) PCT Filed: Mar. 20, 2022

(86) PCT No.: PCT/KR2022/004493

§ 371 (c)(1),
(2) Date: Jun. 1, 2023

(87) PCT Pub. No.: WO2022/220451

PCT Pub. Date: Oct. 20, 2022

(65) Prior Publication Data

US 2024/0002234 A1 Jan. 4, 2024

(30) Foreign Application Priority Data

Apr. 14, 2021 (KR) ........................ 10-2021-0048243

(51) Int. Cl.

*C01B 32/05* (2017.01)
*B01J 20/20* (2006.01)
*H01M 8/1004* (2016.01)

(52) U.S. Cl.

CPC ............... *C01B 32/05* (2017.08); *B01J 20/20* (2013.01); *C01P 2006/12* (2013.01); *C01P 2006/14* (2013.01); *H01M 8/1004* (2013.01)

(58) Field of Classification Search

CPC ....... C01B 32/05; C01B 32/30; C01B 32/306; B01J 20/20; H01M 8/1004; C01P 2006/12; C01P 2006/14

See application file for complete search history.

(56) References Cited

U.S. PATENT DOCUMENTS 4,082,694 A * 4/1978 Wennerberg .......... C01B 32/342 428/408
9,809,457 B2 * 11/2017 Hata ..................... C01B 32/168
2003/0161781 A1 * 8/2003 Cabasso ................ C04B 35/532 29/25.03
2012/0121498 A1 5/2012 Dai
2014/0099553 A1 4/2014 Yu
2015/0232340 A1 8/2015 Bao
2015/0329364 A1 * 11/2015 Dong .................... C01B 32/348 423/460
2016/0280553 A1 9/2016 Sharif Sheikhaleslami

FOREIGN PATENT DOCUMENTS

| | | | |
|---|---|---|---|
| CN | 100999318 | A | 7/2007 |
| CN | 103415492 | A | 11/2013 |
| CN | 103708438 | A | 4/2014 |
| CN | 105916808 | A | 8/2016 |
| JP | 2009-517314 | A | 4/2009 |
| KR | 2003-0068765 | A | 8/2003 |
| KR | 20050117112 | A | 12/2005 |
| KR | 20100125798 | A | 12/2010 |
| KR | 20120137111 | A | 12/2012 |
| KR | 10-2014-0106914 | A | 9/2014 |
| KR | 20150116124 | A | 10/2015 |
| KR | 10-1713658 | B1 | 3/2017 |
| TW | 201246654 | A | 11/2012 |
| WO | 2007062095 | A1 | 5/2007 |

OTHER PUBLICATIONS

Direct Triblock-Copolymer-Templating Synthesis of Highly Ordered Fluorinated Mesoporous Carbon, Chem. Mater. 2008, 20, 1012-1018, Ying Wan et al.
The office action dated May 21, 2024, related to the corresponding Japanese Patent application.
The office action dated Mar. 28, 2024 related to the corresponding Korean Patent application.
Office Action from Korean Patent Office dated Nov. 25, 2024.
The search report dated Jul. 9, 2025 related to the corresponding European Patent application.
Office Action From Chinese Patent Office Dated May 1, 2026 Issued for Corresponding Chinese Patent Application.

* cited by examiner

*Primary Examiner* — Stuart L Hendrickson
(74) *Attorney, Agent, or Firm* — Harvest IP Law, LLP

(57) ABSTRACT

Disclosed are: a method for preparing a porous carbon structure, capable of dramatically increasing the surface area and total pore volume of the porous carbon structure; and a porous carbon structure prepared using same. The method of the present invention comprises the steps of: preparing a template having a mesoporous shell; injecting a carbon precursor into the template, the carbon precursor comprising a polymer precursor and a cross-linking agent, the polymer precursor comprising a first component, which has a halogen functional group, and a second component, which does not have a halogen functional group, and the amount of the first component in the polymer precursor being 20-80 wt %; polymerizing the polymer precursor to form a polymer; carbonizing the polymer to obtain a template-carbon complex; and removing the template from the template-carbon complex.

13 Claims, 5 Drawing Sheets

METHOD FOR PREPARING POROUS CARBON STRUCTURE HAVING INCREASED SURFACE AREA AND TOTAL PORE VOLUME, AND POROUS CARBON STRUCTURE PREPARED USING SAME

CROSS REFERENCE TO RELATED APPLICATION(S)

This application is a National Stage of International Application No. PCT/KR2022/004493 filed on Mar. 20, 2022, claiming priority based on Korean Patent Application No. 10-2021-0048243 filed on Apr. 14, 2021, the disclosure of which is incorporated herein by reference in their entirety.

TECHNICAL FIELD

The present disclosure relates to a method for manufacturing a porous carbon structure having an increased surface area and total pore volume and a porous carbon structure manufactured using the same, and more particularly to a method for manufacturing a porous carbon structure that is capable of remarkably increasing the surface area and total pore volume of the porous carbon structure, and a porous carbon structure manufactured using the same.

BACKGROUND ART

A porous carbon structure is used in a variety of technical fields including (i) the field of adsorbents and (ii) electrochemical fields encompassing fuel cells, secondary cells, and capacitors due to the high surface area, high pore volume, excellent conductivity, and excellent chemical stability thereof.

In an effort to precisely control the microstructure of the porous carbon structure and further increase the surface area and total pore volume thereof, the porous carbon structure is generally manufactured using a template. For example, a carbon precursor (e.g., a monomer) is injected into a template including spherical inorganic particles and a mesoporous shell formed thereon, followed by polymerization and carbonization to prepare a template-carbon complex. Then, the template is removed from the template-carbon complex to manufacture a hollow-type porous carbon structure.

However, the surface area and total pore volume of the porous carbon structure manufactured by the conventional method are insufficient to meet industrial requirements (e.g., a BET surface area of 2,000 $m^2/g$ or more and a total pore volume of 2.0 $cm^3/g$ or more).

Moreover, the BET surface area and total pore volume levels required for porous carbon structures are increasing in some technical fields.

DISCLOSURE

Technical Problem

Therefore, the present disclosure is directed to a method for manufacturing a porous carbon structure having increased surface area and total pore volume and a porous carbon structure manufactured using the same that are capable of preventing problems attributable to the limitations and drawbacks of the related art.

It is one aspect of the present disclosure to provide a method capable of producing a porous carbon structure having a greatly increased surface area and total pore volume.

It is another aspect of the present disclosure to provide a porous carbon structure having a greatly increased surface area and total pore volume.

It is another aspect of the present disclosure to provide an adsorbent that is imparted with excellent performance by including the porous carbon structure having a greatly increased surface area and total pore volume.

It is another aspect of the present disclosure to provide an electrode for electrochemical devices that is imparted with excellent performance by including the porous carbon structure having a greatly increased surface area and total pore volume.

It is another aspect of the present disclosure to provide a membrane-electrode assembly that is imparted with excellent performance by including an anode and/or cathode having the porous carbon structure having a greatly increased surface area and total pore volume.

It is another aspect of the present disclosure to provide a fuel cell that is imparted with excellent performance by including the membrane-electrode assembly.

In addition to the aspects of the present disclosure described above, other features and advantages of the present disclosure will be described in the following detailed description, as will be clearly understood by those skilled in the art to which the present disclosure pertains.

Technical Solution

In accordance with one aspect of the present disclosure, provided is a method for manufacturing a porous carbon structure, the method including preparing a template having a mesoporous shell, injecting a carbon precursor into the template, wherein the carbon precursor contains a polymer precursor and a crosslinking agent, wherein the polymer precursor contains a first component having a halogen functional group and a second component not having a halogen functional group, wherein the content of the first component in the polymer precursor is 20 to 80% by weight, polymerizing the polymer precursor to form a polymer, carbonizing the polymer to obtain a template-carbon complex, and removing the template from the template-carbon complex.

The first component may be a halogenated monomer or $NH_4F$.

The halogenated monomer may be a fluorinated monomer.

The first component may be fluorophenol, the second component may be phenol, and the crosslinking agent may be paraformaldehyde.

The fluorophenol may be 4-fluorophenol.

The first component may be $NH_4F$, the second component may be phenol, and the crosslinking agent may be paraformaldehyde.

The method may further include treating the template with an acid before injecting the carbon precursor.

The acid may include $AlCl_3$.

In accordance with another aspect of the present disclosure, there is provided a porous carbon structure having a BET surface area of 2,000 to 5,000 $m^2/g$ and a total pore volume of 2.0 to 7.2 $cm^3/g$.

The porous carbon structure may have a BET surface area of 2,300 to 5,000 $m^2/g$ and a total pore volume of 2.8 to 7.2 $cm^3/g$.

The porous carbon structure may have a BET surface area of 3,100 to 5,000 $m^2/g$ and a total pore volume of 5.0 to 7.2 $cm^3/g$.

The porous carbon structure may have a BET surface area of 3,400 to 5,000 $m^2/g$ and a total pore volume of 5.7 to 7.2 $cm^3/g$.

The porous carbon structure may have a hollow structure.

In accordance with another aspect of the present disclosure, there is provided an adsorbent including the porous carbon structure.

In accordance with another aspect of the present disclosure, there is provided an electrode for electrochemical devices, the electrode including the porous carbon structure.

In accordance with another aspect of the present disclosure, there is provided a membrane-electrode assembly including an anode, a cathode, and an electrolyte membrane between the anode and the cathode, wherein at least one electrode selected from the group consisting of the anode and the cathode includes the porous carbon structure, and catalytic metal particles dispersed on the porous carbon structure.

In accordance with another aspect of the present disclosure, there is provided a fuel cell including the membrane-electrode assembly.

The above general description of the present disclosure is provided only for illustration of the present disclosure, and does not limit the scope of the present disclosure.

Advantageous Effects

The present disclosure provides a porous carbon structure having a remarkably increased surface area and total pore volume which is capable of overcoming the limitations of the prior art. Accordingly, the present disclosure can meet the demand, attributable to technological development in related fields, for a porous carbon structure having a higher surface area and total pore volume.

In addition, the porous carbon structure of the present disclosure is capable of improving the performance of the adsorbent containing the same as well as the performance of the electrochemical device (e.g., fuel cell, secondary battery, capacitor, etc.) including the same.

DESCRIPTION OF DRAWINGS

The above and other objects, features, and other advantages of the present disclosure will be more clearly understood from the following detailed description taken in conjunction with the accompanying drawings, in which:

FIG. 3B is a TEM image of the porous carbon structure of Comparative Example 2a;

FIG. 3C is a TEM image of the porous carbon structure of Example 2a;

BEST MODE

Hereinafter, embodiments of the present disclosure will be described in detail with reference to the accompanying drawings. However, the following embodiments are illustratively provided merely for clear understanding of the present disclosure, and do not limit the scope of the present disclosure.

Figure 1:
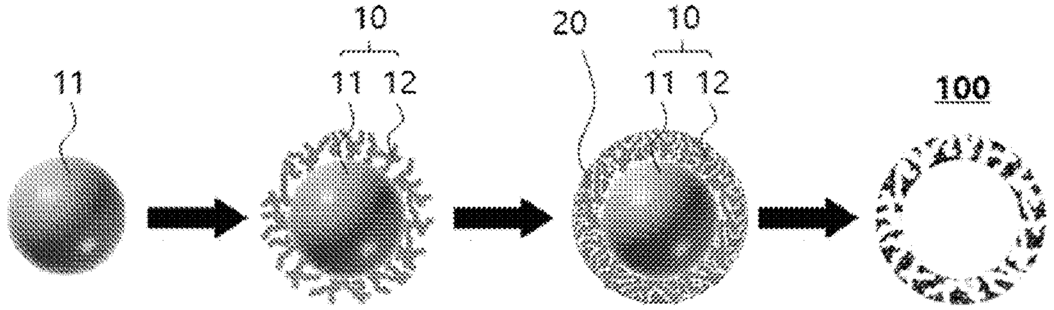
FIG. 1 is a schematic diagram illustrating a method for manufacturing a porous carbon structure according to an embodiment of the present disclosure.

FIG. 1 is a schematic diagram illustrating a method for manufacturing a porous carbon structure according to an embodiment of the present disclosure.

As shown in FIG. 1, the method of the present disclosure includes preparing a template 10 having a mesoporous shell 12, injecting a carbon precursor 20 into the template 10, polymerizing the carbon precursor 20 to form a polymer, carbonizing the polymer to obtain a template-carbon complex, and removing the template 10 from the template-carbon complex.

The preparing the template 10 may include forming the mesoporous shell 12 on spherical inorganic particles 11.

The inorganic particles 11 may include inorganic oxides such as zirconia, alumina, titania, silica, and ceria. For example, commercially available silica particles having a diameter of 10 nm to 1,000 nm may be used as the inorganic particles 11. Alternatively, the silica particles are prepared by adding tetraethyl orthosilicate (TEOS) (also referred to as "tetraethoxysilane") to a mixed solution of aqueous ammonia, ethanol, and deionized water, and stirring the resulting mixture for a sufficient time.

Hereinafter, for convenience of description, a method of preparing the template 10 including silica particles as the inorganic particles 11 will be described in detail.

First, TEOS and octadecyltrimethoxysilane ($C_{18}$-TMS) are added to a dispersion obtained by injecting the silica particles 11 into a dispersion medium (e.g., a mixed dispersion medium of ethanol and water) and stirred for a sufficient time. Here, the $C_{18}$-TMS functions as a silane coupling agent. By controlling the molar ratio of TEOS to $C_{18}$-TMS, the pore size of the mesoporous shell 12 formed through the following calcination process can be adjusted within the range of 2 to 50 nm. For example, the molar ratio may be 3 to 50. As the molar ratio of TEOS to $C_{18}$-TMS increases, the pore size of the mesoporous shell 12 decreases.

Subsequently, the silica particles 11 are separated from the dispersion by, for example, centrifugation, and are then placed in a furnace and calcined at 500° C. to 600° C. (e.g., about 550° C.) for 5 to 7 hours. The organic functional group of the silane coupling agent (i.e., $C_{18}$-TMS) is removed through the calcination process, so the mesoporous shell 12 can be formed on the silica particles 11.

As an optional process, the template 10 thus obtained may be treated with an acid. For example, the template 10 is immersed in an acid solution containing $AlCl_3$, dried, and then calcined at 500° C. to 600° C. (e.g., about 550° C.) for 2 to 4 hours to prepare a template 10 having a mesoporous aluminosilica shell 12. Such acid treatment enables formation of acid sites on the surface of the template 10 to induce surface reaction, ultimately maximizing the surface area and overall pore volume of the porous carbon structure 100 manufactured through the template 10.

Then, as shown in FIG. 1, a carbon precursor 20 is injected into the template 10. There is no particular limitation as to the method of injecting the carbon precursor 20 in the present disclosure. For example, the carbon precursor 20 may be injected into the mesopores in the template 10 through a method such as vacuum-filling.

According to the present disclosure, the carbon precursor 20 contains a polymer precursor and a crosslinking agent, and the polymer precursor contains a first component having a halogen functional group and a second component not having a halogen functional group. Each of the first and second components may be a monomer. Alternatively, the first component may be a halogenating agent, and only the second component may be a monomer component. In some cases, the carbon precursor 20 may further contain an initiator for polymerization of the monomer component(s).

The monomer component(s) may form a polymer through condensation polymerization or addition polymerization. For example, the carbon precursor 20 may contain phenolic monomer(s) capable of forming a phenolic resin through condensation polymerization as monomer component(s) and paraformaldehyde as a crosslinking agent.

The first component having a halogen functional group may be a halogenated monomer and/or $NH_4F$. The halogenated monomer is a monomer in which the same monomer as the second component is substituted with a halogen functional group, and may be a fluorinated monomer, a chlorinated monomer, a brominated monomer, or an iodinated monomer, and is preferably a fluorinated monomer.

For example, when the carbon precursor 20 contains phenol as the second component and paraformaldehyde as the crosslinking agent, the first component may be a halogenated phenol such as fluorophenol, chlorophenol, bromophenol, or iodophenol, preferably fluorophenol, and more preferably 4-fluorophenol. That is, the carbon precursor 20 according to an embodiment of the present disclosure may contain 4-fluorophenol, phenol, and paraformaldehyde.

Alternatively, instead of or in addition to the halogenated monomer, the carbon precursor 20 of the present disclosure may contain $NH_4F$ as the first component having a halogen functional group. For example, the carbon precursor 20 according to an embodiment of the present disclosure may include $NH_4F$, phenol, and paraformaldehyde.

The inventors of the present disclosure found that the "first component having a halogen functional group" contained in the carbon precursor 20 remarkably increases the surface area of the carbon structure obtained through polymerization and carbonization of the carbon precursor 20.

Figure 2:
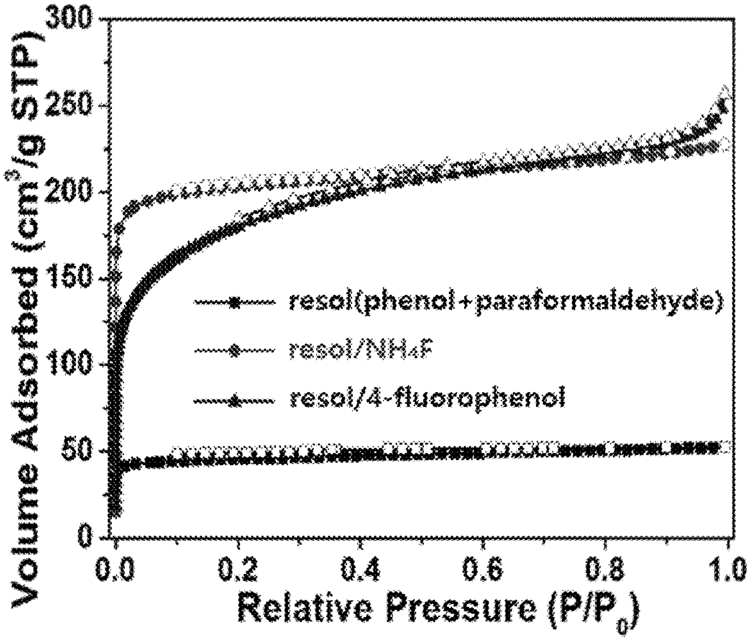
FIG. 2 is BET adsorption/desorption isotherm curves of carbon structures obtained through polymerization and carbonization of carbon precursors containing the "component having a halogen functional group" of the present disclosure and conventional carbon precursors.
Figure 3A:
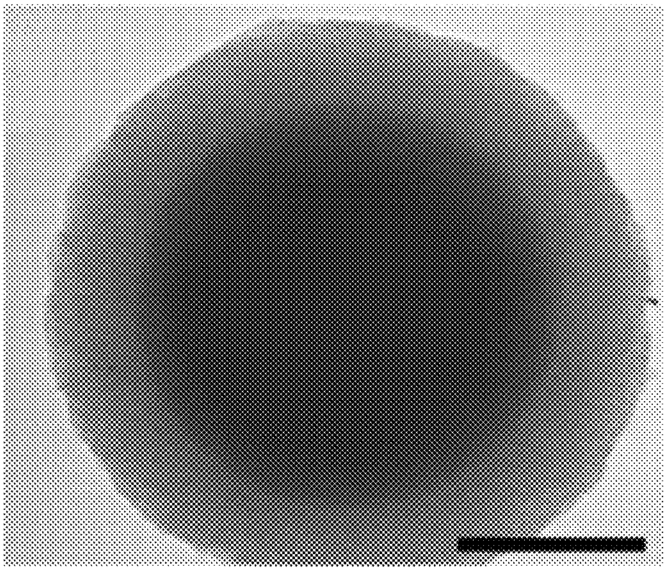
FIG. 3A is a transmission electron microscope (TEM) image of the template of Preparation Example 2.
Figure 3B:
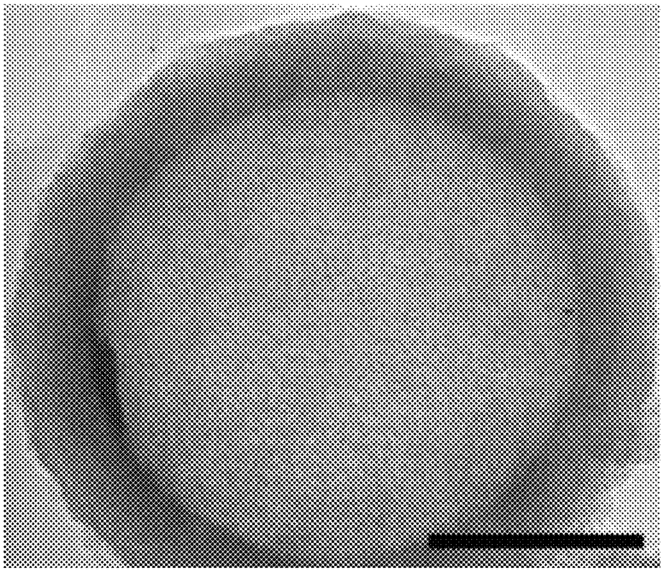
Figure 3C:
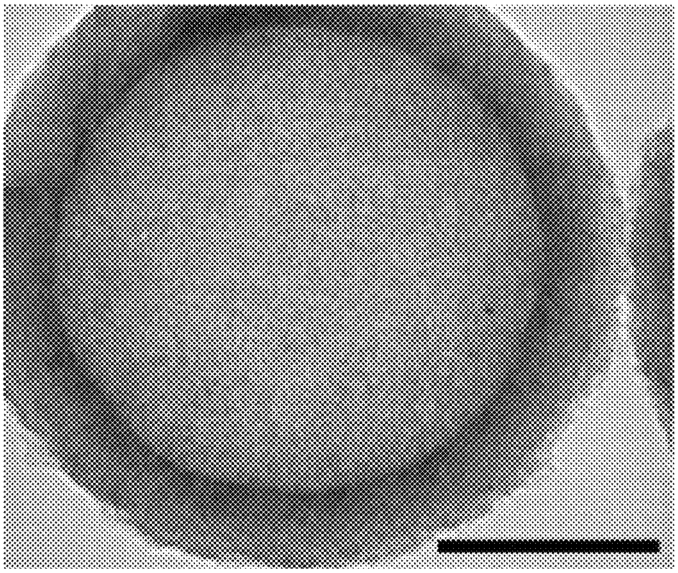
Figure 3D:
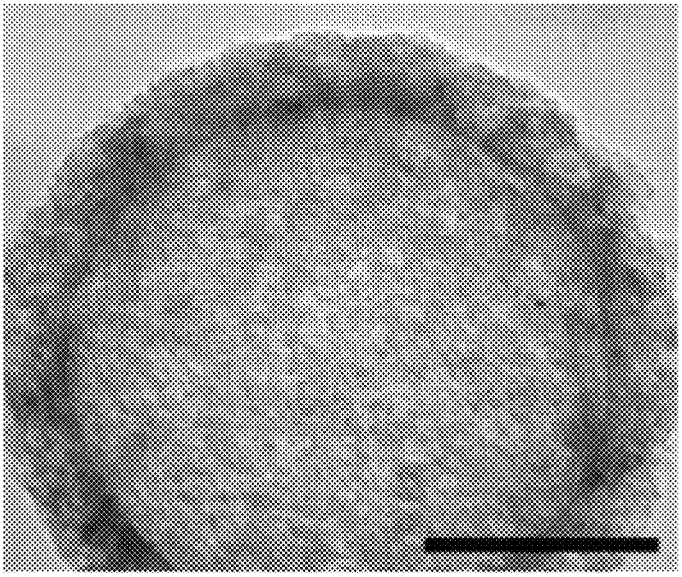
FIG. 3D is a TEM image of the porous carbon structure of Example 2b.
Figure 3E:
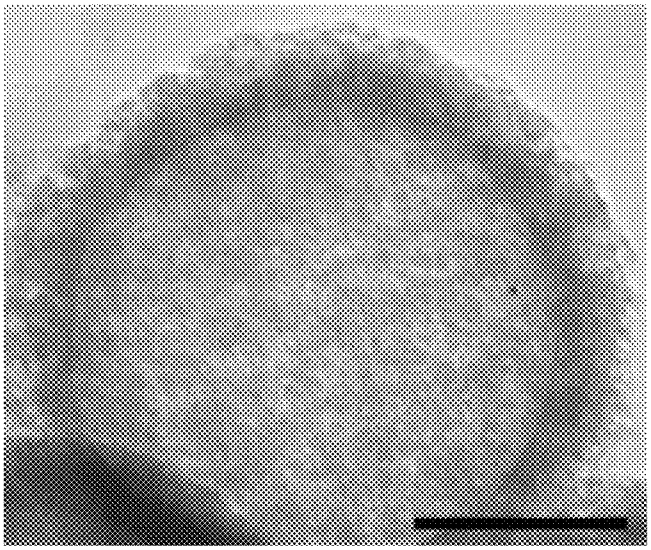
FIG. 3E is a TEM image of the porous carbon structure of Example 2c.
Figure 3F:
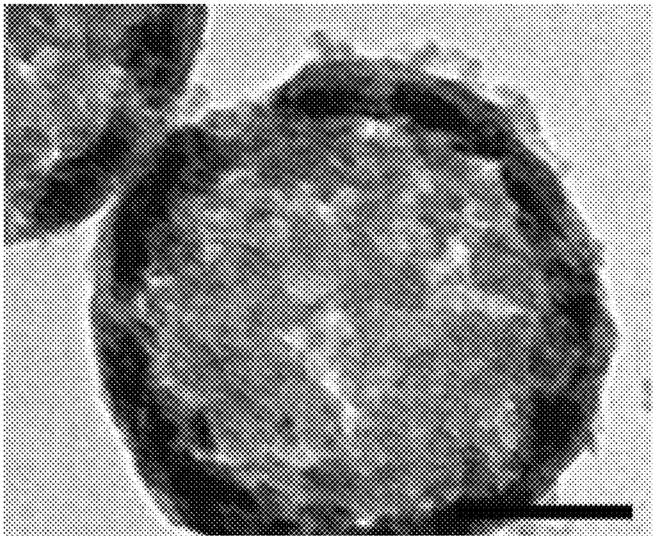
FIG. 3F is a TEM image of the porous carbon structure of Comparative Example 2b.

FIG. 2 is BET adsorption/desorption isotherm curves of carbon structures obtained through polymerization and carbonization of carbon precursors containing the "first component having a halogen functional group" of the present disclosure and a conventional carbon precursor.

Specifically, the graph of FIG. 2 shows (i) a BET adsorption/desorption isotherm curve of a first carbon precursor obtained by heating a carbon precursor (phenol: 0.2 g, 4-fluorophenol: 0.2 g) containing 4-fluorophenol along with phenol and paraformaldehyde at 160° C. for 6 hours, followed by polymerization and carbonization at 1,000° C. for 6 hours in an Ar atmosphere, (ii) a BET adsorption/desorption isotherm curve of a second carbon precursor obtained by heating a carbon precursor (phenol: 0.3 g, $NH_4F$: 0.1 g) containing $NH_4F$ along with phenol and paraformaldehyde at 160° C. for 6 hours, followed by polymerization and carbonization at 1,000° C. for 6 hours in an Ar atmosphere, and (iii) a BET adsorption/desorption isotherm curve of a third carbon precursor obtained by heating a carbon precursor (phenol: 0.4 g) containing phenol and paraformaldehyde at 160° C. for 6 hours, followed by polymerization and carbonization at 1,000° C. for 6 hours in an Ar atmosphere.

As can be seen from FIG. 2, the carbon structure (that is, the first and second carbon structures) obtained from the carbon precursor 20 of the present disclosure further containing a "first component having a halogen functional group" such as 4-fluorophenol or $NH_4F$, in addition to the second component, which is a monomer, has a much larger surface area than that of the carbon structure (that is, the third carbon structure) obtained from the carbon precursor of the present disclosure containing only a second component, which is a monomer, and lacking the "component having a halogen functional group".

According to an embodiment of the present disclosure, the content of the first component having a halogen functional group in the polymer precursor containing the first and second components is 20 to 80% by weight, more preferably 25 to 75% by weight. When the content of the first component having a halogen functional group in the polymer precursor is less than 20% by weight, the effect of increasing the surface area of the carbon structure according to the present disclosure may be insufficient. On the other hand, when the content of the first component having a halogen functional group in the polymer precursor is greater than 80% by weight, structural collapse of the carbon structure occurs, and the surface area thereof is rather reduced.

Referring back to FIG. 1, the carbon precursor 20 is injected into the template 10 and then the carbon precursor 20 (more specifically, a polymer precursor, and still more specifically, monomer component(s)) is polymerized to form a polymer. The temperature and time of the polymerization reaction may be determined in consideration of the components constituting the carbon precursor 20. For example, when the carbon precursor 20 contains phenolic monomer(s) and paraformaldehyde, the polymerization reaction may be performed at a temperature of 150 to 200° C. for 5 to 7 hours.

Then, the polymer formed through polymerization of the carbon precursor 20 is carbonized to obtain a template-carbon complex. The carbonization process may be performed for 5 to 7 hours at a temperature of 800 to 1,200° C. in the presence of an inert gas such as Ar or $N_2$.

Then, the template 10 is removed from the template-carbon complex to obtain the porous carbon structure 100 of the present disclosure. For example, the template 10 is dissolved in a strong base (e.g., NaOH, KOH, etc.) or a strong acid (e.g., HF), and the remaining structure is washed with ethanol, water, or a mixture thereof and dried for a sufficient time at the boiling point of the washing solution or higher to obtain a porous carbon structure 100.

The porous carbon structure 100 of the present disclosure obtained through the method described above has a high BET surface area of 2,000 to 5,000 $m^2/g$, more preferably 2,300 to 5,000 $m^2/g$, and a high total pore volume of 2.0 to 7.2 $cm^3/g$, more preferably 2.8 to 7.2 $cm^3/g$.

In particular, when the template 10 is subjected to acid treatment (e.g., using $AlCl_3$) and calcination before injecting the carbon precursor 20 into the template 10, the final porous carbon structure 100 thus obtained has a higher BET surface area of 3,100 to 5,000 $m^2/g$, more preferably 3,400 to 5,000 $m^2/g$, and a higher total pore volume of 5.0 to 7.2 $cm^3/g$, more preferably 5.7 to 7.2 $cm^3/g$.

The porous carbon structure 100 of the present disclosure may be a hollow structure, as illustrated in FIG. 1.

The porous carbon structure 100 of the present disclosure may be used in the preparation of an adsorbent and/or an electrode for an electrochemical device, thereby improving the performance thereof.

For example, the porous carbon structure 100 of the present disclosure may be used to manufacture a membrane-electrode assembly for a fuel cell. In other words, in the membrane-electrode assembly including an anode, a cathode, and an electrolyte membrane between the anode and the cathode, at least one electrode selected from the group consisting of the anode and the cathode includes the porous carbon structure 100 of the present disclosure and catalyst metal particles dispersed on the porous carbon structure 100.

Hereinafter, the present disclosure will be described in more detail with reference to Preparation Examples, Examples, and Comparative Examples. However, the Preparation Examples, Examples, and Comparative Examples should not be construed as limiting the scope of the present disclosure.

Template Preparation

Preparation Example 1

Commercially available silica nanoparticles were dispersed in a mixed dispersion medium of ethanol and water to obtain a mixture. TEOS and $C_{18}$-TMS were added to the mixture and stirred for 4 hours. Then, the silica nanoparticles separated from the mixture by centrifugation were calcined at 550° C. for 6 hours to prepare a template in which a mesoporous shell was formed on each of the silica nanoparticles.

Preparation Example 2

The template obtained in Preparation Example 1 was immersed in 0.2 g of an $AlCl_3$-containing solution, dried, and calcined at 550° C. for 3 hours to prepare a template having a mesoporous aluminosilica shell.

Preparation of Porous Carbon Structure Using Template of Preparation Example 1

Example 1a

A carbon precursor was injected into the mesopores in the template obtained in Preparation Example 1 through a vacuum-filling method. The carbon precursor contained a polymer precursor (4-fluorophenol and phenol) and a cross-linking agent (paraformaldehyde). The contents of 4-fluorophenol and phenol in the polymer precursor were 0.1 g and 0.3 g, respectively. Subsequently, the template into which the carbon precursor was injected was heated at 160° C. for 6 hours to polymerize the carbon precursor. Then, the polymer was carbonized at 1,000° C. for 6 hours in an Ar atmosphere to obtain a template-carbon complex. Subsequently, the template 10 was dissolved in HF and removed from the template-carbon complex, and the remaining structure was washed and dried to complete a porous carbon structure.

Example 1b

A porous carbon structure was completed in the same manner as in Example 1a, except that the contents of 4-fluorophenol and phenol in the polymer precursor were both 0.2 g.

Example 1c

A porous carbon structure was completed in the same manner as in Example 1a, except that the contents of 4-fluorophenol and phenol in the polymer precursor were 0.3 g and 0.1 g, respectively.

Comparative Example 1a

A porous carbon structure was completed in the same manner as in Example 1a, except that the polymer precursor contained only phenol (0.4 g), without 4-fluorophenol.

Comparative Example 1b

A porous carbon structure was completed in the same manner as in Example 1a, except that the polymer precursor contained only 4-fluorophenol (0.4 g), without phenol.

Preparation of Porous Carbon Structure Using Template of Preparation Example 2

Example 2a

A porous carbon structure was completed in the same manner as in Example 1a, except that the template of Preparation Example 2 was used, instead of the template of Preparation Example 1.

Example 2b

A porous carbon structure was completed in the same manner as in Example 2a, except that the contents of 4-fluorophenol and phenol in the polymer precursor were both 0.2 g.

Example 2c

A porous carbon structure was completed in the same manner as in Example 2a, except that the contents of 4-fluorophenol and phenol in the polymer precursor were 0.3 g and 0.1 g, respectively.

Comparative Example 2a

A porous carbon structure was completed in the same manner as in Example 2a, except that the polymer precursor contained only phenol (0.4 g), without 4-fluorophenol.

Comparative Example 2b

A porous carbon structure was completed in the same manner as in Example 2a, except that the polymer precursor contained only 4-fluorophenol (0.4 g), without phenol.

[Transmission Electron Microscopy (TEM) Analysis]

Transmission electron micrographs of the template of Preparation Example 2, having a mesoporous aluminosilica shell, and the porous carbon structures of Examples 2a to 2c and Comparative Examples 2a and 2b are shown in FIG. 3. FIG. 3A is a TEM image of the template of Preparation Example 2, FIG. 3B is a TEM image of the porous carbon structure of Comparative Example 2a in which the content of 4-fluorophenol in the carbon precursor is 0 wt %, FIG. 3C is a TEM image of the porous carbon structure of Example 2a in which the weight ratio of 4-fluorophenol to phenol in the carbon precursor is 1:3, FIG. 3D is a TEM image of the porous carbon structure of Example 2b in which the weight ratio of 4-fluorophenol to phenol in the carbon precursor is 1:1, FIG. 3E is a TEM image of the porous carbon structure of Example 2c in which the weight ratio of 4-fluorophenol to phenol in the carbon precursor is 3:1, and FIG. 3F is a TEM image of the porous carbon structure of Comparative Example 2b in which the content of phenol in the carbon precursor is 0 wt %.

FIGS. 3B to 3E show that, as the content of the component having a halogen functional group (i.e., 4-fluorophenol) in the polymer precursor (or the weight ratio of the first component having a halogen functional group to the second component not having a halogen functional group) increases, the porosity of the mesoporous shell of the hollow carbon structure increases. On the other hand, as can be seen from FIG. 3F, when the content of the component having a halogen functional group (i.e., 4-fluorophenol) in the polymer precursor was excessively high, the carbon structure collapsed.

[Brunauer-Emmett-Teller (BET) Surface Area Analysis]

Figure 4:
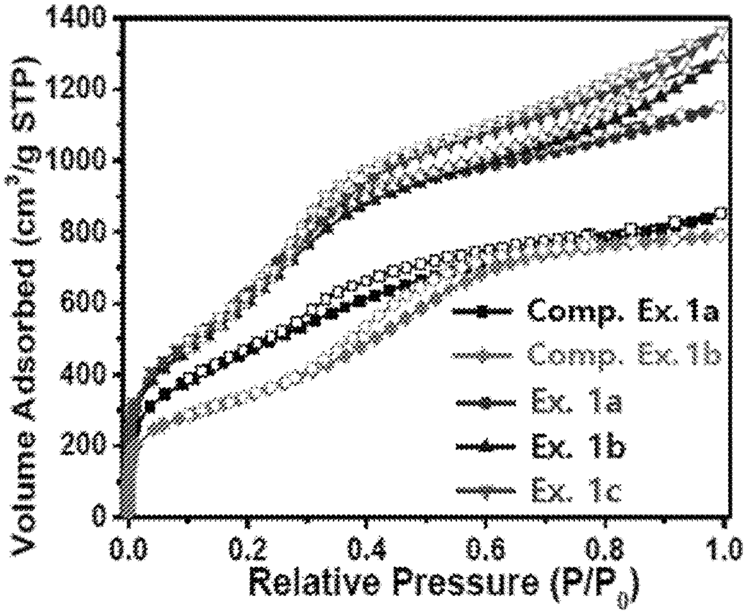
FIG. 4 is BET adsorption/desorption isothermal curves of the porous carbon structures of Examples 1a to 1c and the porous carbon structures of Comparative Examples 1a and 1b.

BET adsorption/desorption isotherm curves of the porous carbon structures of Examples and Comparative Examples were obtained using a BET analyzer (Micromeritics, ASAP-2020). FIG. 4 is BET adsorption/desorption isothermal curves of the porous carbon structures of Examples 1a to 1c and the porous carbon structures of Comparative Examples 1a and 1b, and FIG. 5 is BET adsorption/desorption isotherms of the porous carbon structures of Examples 2a to 2c and Comparative Examples 2a and 2b.

Figure 5:
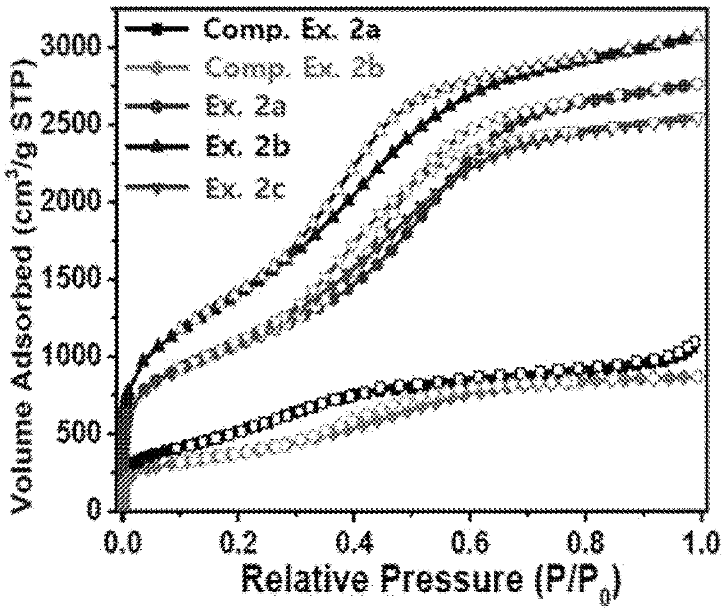
FIG. 5 is BET adsorption/desorption isothermal curves of the porous carbon structures of Examples 2a to 2c and the porous carbon structures of Comparative Examples 2a and 2b.

As can be seen from FIGS. 4 and 5, the porous carbon structures according to embodiments of the present disclosure, prepared using a carbon precursor that contains a component having a halogen functional group (i.e., 4-fluorophenol) in an appropriate amount, have a much larger surface area than the porous carbon structures of Comparative Examples 1a and 2a, prepared using a carbon precursor that does not contain a component having a halogen functional group.

On the other hand, the BET adsorption/desorption isothermal curves of Comparative Examples 1b and 2b demonstrate the fact that when a porous carbon structure is prepared using a carbon precursor containing an excessively large amount of a component having a halogen functional group, the carbon structure collapses, and thus the surface area thereof is reduced.

In addition, the BET surface area ($S_{BET}$), micropore volume ($V_{MICRO}$), mesopore volume ($V_{MESO}$), total pore volume ($V_{TOTAL}$), and pore size of the templates of Preparation Examples and the porous carbon structures of Examples and Comparative Examples were measured using a BET analyzer (Micromeritics, ASAP-2020). Specifically, the physical properties of five randomly selected samples were measured, and the average of the measured values for each physical property was calculated, and is shown in Table 1 below.

TABLE 1

| | Content of 4-fluorophenol in carbon precursor (wt %) | $S_{BET}$ ($m^2/g$) | $V_{MICRO}$ ($cm^3/g$) | $V_{MESO}$ ($cm^3/g$) | $V_{TOTAL}$ ($cm^3/g$) | Pore size (nm) |
|---|---|---|---|---|---|---|
| Prep. Ex. 1 | — | 450 | 0.16 | 0.23 | 0.39 | 4.1 |
| Comp. Ex. 1a | 0 | 1319 | 0.91 | 0.70 | 1.61 | 2.9 |
| Ex. 1a | 25 | 2336 | 1.02 | 1.79 | 2.81 | 2.7 |
| Ex. 1b | 50 | 2568 | 1.04 | 1.93 | 2.97 | 2.8 |
| Ex. 1c | 75 | 2864 | 1.08 | 2.03 | 3.11 | 2.9 |
| Comp. Ex. 1b | 100 | 1304 | 0.72 | 0.84 | 1.56 | 2.8 |
| Prep. Ex. 2 | — | 436 | 0.16 | 0.23 | 0.39 | 4.0 |
| Comp. Ex. 2a | 0 | 1480 | 0.90 | 1.03 | 1.93 | 3.3 |
| Ex. 2a | 25 | 3610 | 2.37 | 3.51 | 5.88 | 2.7 & 4.3 |
| Ex. 2b | 50 | 4400 | 2.73 | 4.03 | 6.76 | 2.7 & 4.5 |
| Ex. 2c | 75 | 3420 | 2.17 | 3.59 | 5.76 | 3.0 & 4.6 |
| Comp. Ex. 2b | 100 | 1310 | 0.72 | 0.84 | 1.56 | 4.3 |

As can be seen from Table 1, the porous carbon structures of Comparative Examples have a relatively low BET surface area ($S_{BET}$) of less than 1,500 $m^2/g$ and a relatively low total pore volume ($V_{TOTAL}$) of less than 2.0 $cm^3/g$, whereas the porous carbon structures of the embodiments of the present disclosure have a high BET surface area ($S_{BET}$) of 2,000 to 4,400 $m^2/g$, more specifically 2,300 to 4,400 $m^2/g$, and a high total pore volume ($V_{TOTAL}$) of 2.0 to 6.8 $cm^3/g$, more specifically 2.8 to 6.8 $cm^3/g$.

In particular, the porous carbon structures of Examples 2a to 2c, each prepared using the template of Preparation Example 2 which is a template obtained by immersing the template of Preparation Example 1 in an acid solution containing $AlCl_3$ followed by drying and calcination, have a remarkably high BET surface area ($S_{BET}$) of 3,100 to 4,400 $m^2/g$, more specifically 3,400 to 4,400 $m^2/g$, and a remarkably high total pore volume ($V_{TOTAL}$) of 5.0 to 6.8 $cm^3/g$, more specifically 5.7 to 6.8 $cm^3/g$.

On the other hand, each of Examples 2a to 2c showed two pore size values, which means that the pores of these carbon structures have a bimodal size distribution.

The invention claimed is:

1. A method for manufacturing a porous carbon structure having a BET surface area of 3,400 to 5,000 $m^2/g$ and a total pore volume of 5.7 to 7.2 $cm^3/g$, the method comprising:
   preparing a template having a mesoporous shell;
   treating the template with an acid;
   injecting a carbon precursor into the acid-treated template, wherein the carbon precursor comprises a polymer precursor and a crosslinking agent, the polymer precursor comprises a first component having a halogen functional group and a second component not having a halogen functional group, and a content of the first component in the polymer precursor is 20 to 80% by weight;
   polymerizing the polymer precursor to form a polymer;
   carbonizing the polymer to obtain a template-carbon complex; and
   removing the template from the template-carbon complex.

2. The method according to claim 1, wherein the first component is a halogenated monomer or $NH_4F$.

3. The method according to claim 2, wherein the halogenated monomer is a fluorinated monomer.

4. The method according to claim 1, wherein the first component is fluorophenol,
   the second component is phenol, and
   the crosslinking agent is paraformaldehyde.

5. The method according to claim 4, wherein the fluorophenol is 4-fluorophenol.

6. The method according to claim 1, wherein the first component is $NH_4F$, the second component is phenol, and the crosslinking agent is paraformaldehyde.

7. The method according to claim 1, wherein the acid comprises $AlCl_3$.

8. A porous carbon structure having a BET surface area of 3,400 to 5,000 $m^2/g$ and a total pore volume of 5.7 to 7.2 $cm^3/g$.

9. The porous carbon structure according to claim 8, wherein the porous carbon structure has a hollow structure.

10. An adsorbent comprising the porous carbon structure according to claim 8.

11. An electrode for electrochemical devices, the electrode comprising the porous carbon structure according to claim 8.

12. A membrane-electrode assembly comprising:

an anode;

a cathode; and an electrolyte membrane between the anode and the cathode, wherein at least one electrode selected from the group consisting of the anode and the cathode comprises:

the porous carbon structure according to claim 8; and catalytic metal particles dispersed on the porous carbon structure.

13. A fuel cell comprising the membrane-electrode assembly according to claim 12.

* * * * *